Oct. 9, 1956    A. J. SACKSTEDER    2,766,369
ELECTRICAL APPARATUS
Filed Nov. 10, 1953    3 Sheets-Sheet 3
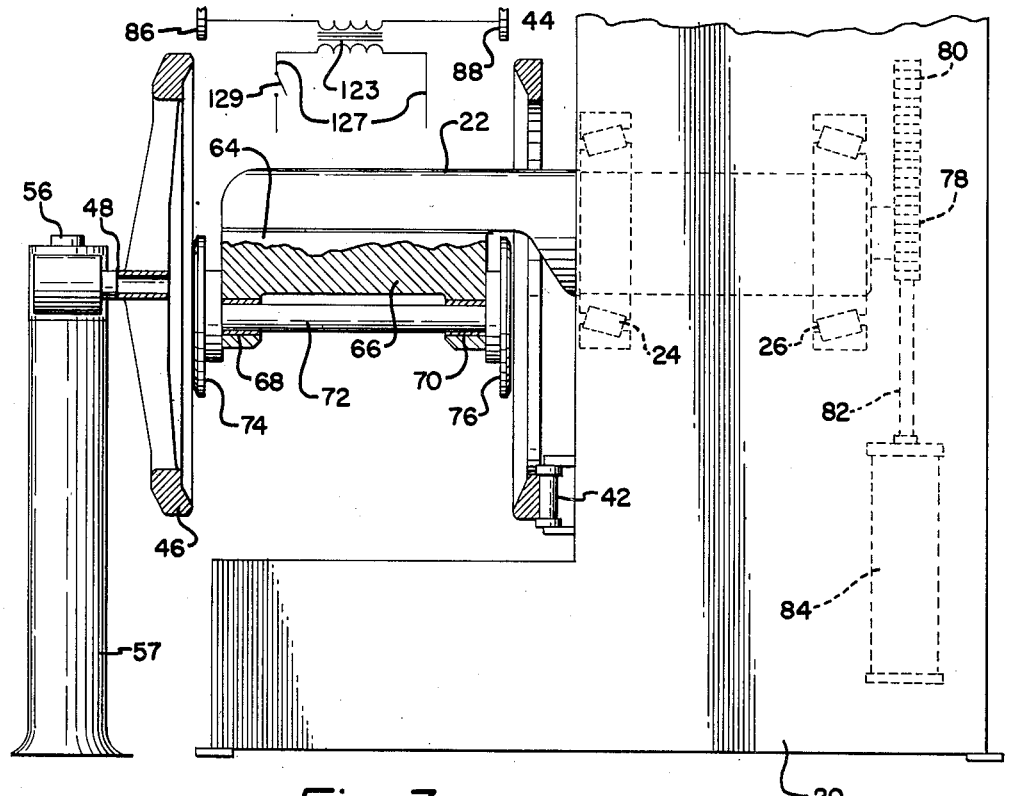
Fig. 3
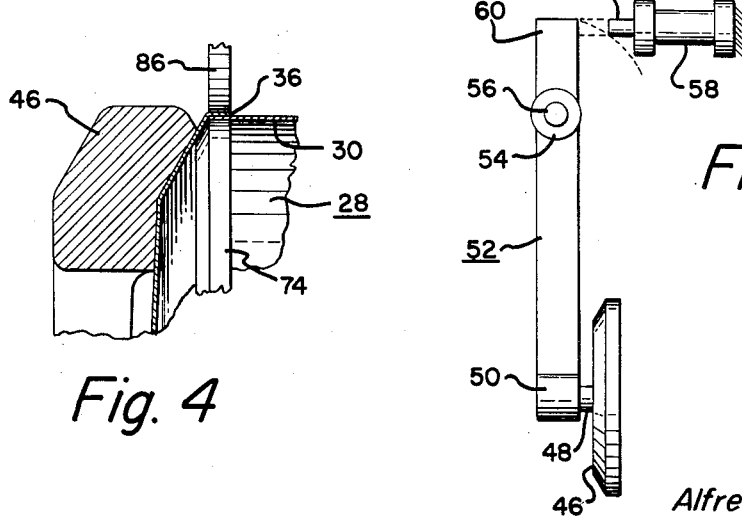
Fig. 4
Fig. 5
INVENTOR.
Alfred J. Sacksteder
BY R. R. Candor
His Attorney

United States Patent Office 2,766,369
Patented Oct. 9, 1956

2,766,369

ELECTRICAL APPARATUS

Alfred J. Sacksteder, Dayton, Ohio, assignor to General Motors Corporation, Detroit, Mich., a corporation of Delaware Application November 10, 1953, Serial No. 391,223

3 Claims. (Cl. 219—81)

This invention relates to electrical apparatus and more particularly to work supports and welding machines provided with special work supports.

It is customary in the welding of drums and other hollow objects to provide external welding flanges particularly for welding the end pieces to the center section. For many applications these external flanges are not desirable since they prevent the attainment of a smooth outline.

It is an object of my invention to provide a work support capable of being used with a welding machine in such a way that two simple welded lap joints may be made simultaneously to connect both the ends of drums and simple hollow objects to the center sections.

It is another object of my invention to provide an overhanging work support capable of being rotated to one position for easy insertion into the hollow object or drum and capable of being rotated within the hollow object or drum into contact with the inner surface of the outer walls.

In the form shown in the drawings, a rotatable shaft is mounted in a welding machine on an axis above but parallel to the horizontal axis of the drum to be welded and the drum support. This shaft is provided with bearings supporting a pair of welding wheels connected by an axle. The axis of the axle is parallel to but eccentric to the axis of the shaft. The parts are so dimensioned that the open end portion of the drum may be slipped over the shaft and the welding wheels thereon after which the shaft is rotated 180° until the welding wheels are in contact with the inner periphery of the drum at the points at which it is desired to weld the lap joints connecting the ends with the cylindrical center portion.

Further objects and advantages of the present invention will be apparent from the following description, reference being had to the accompanying drawings wherein a preferred from of the invention is clearly shown.

In the drawings:

Figure 3 is a fragmentary side elevation of the welding machine showing the welding supports in position for receiving or removing the drum;

Figure 4 is an enlarged fragmentary sectional view showing the lap joint and the welding wheels in contact with the lap joint; and Figure 5 is a top view of the support for the outer end of the drum.

Figure 1:
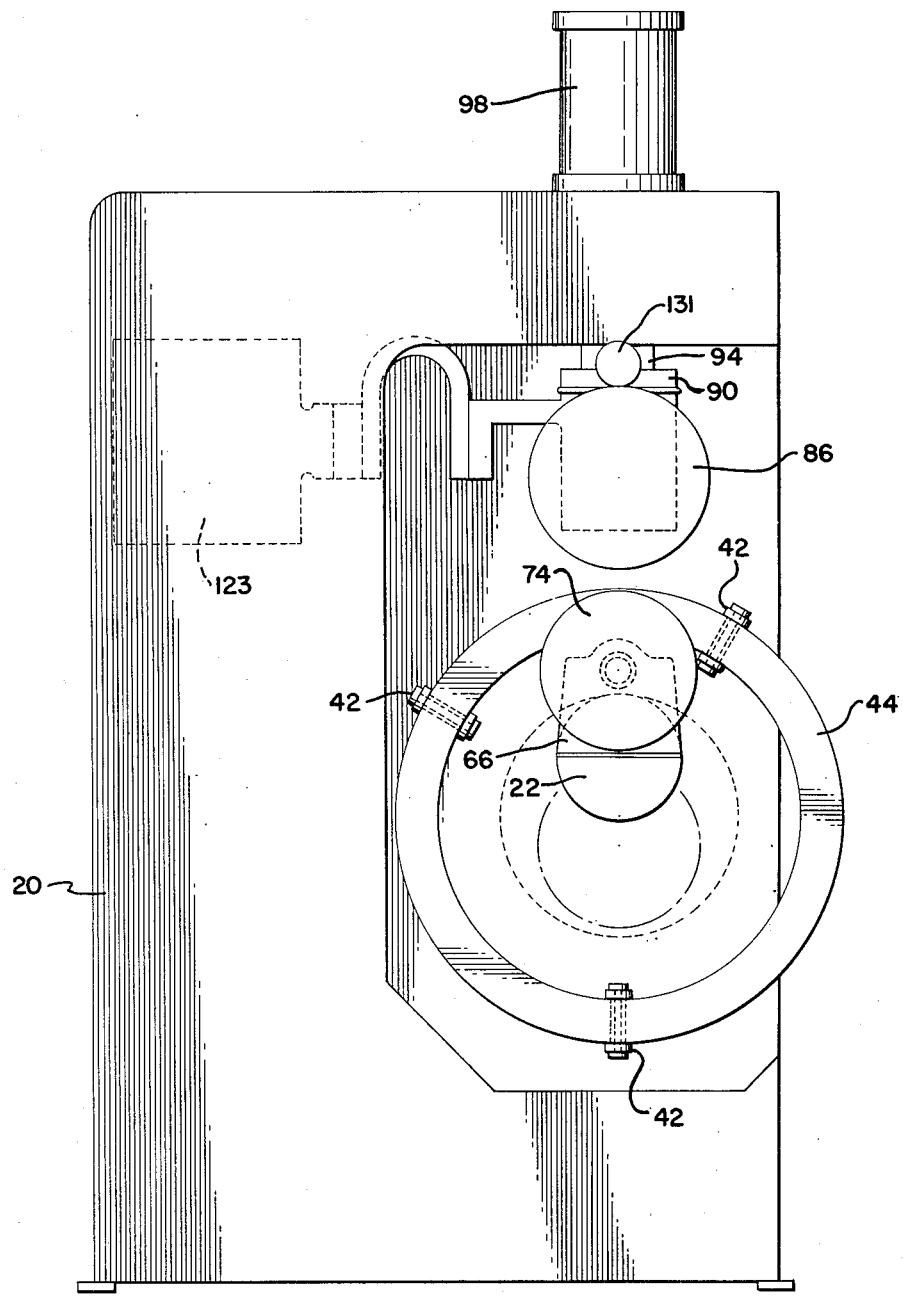
Figure 1 is a front view of a welding machine embodying a support according to my invention.

Referring now to the drawing there is shown a welding machine including a large frame 20 of some suitable material such as fabricated steel which is adapted to be mounted upon a floor. This welding machine includes a rotatable support member 22 which is rotatably mounted upon the spaced bearings 24 and 26 which are supported within the frame 20. The axis of the shaft 22 and the bearing 24 and 26 is substantially horizontal.

Figure 2:
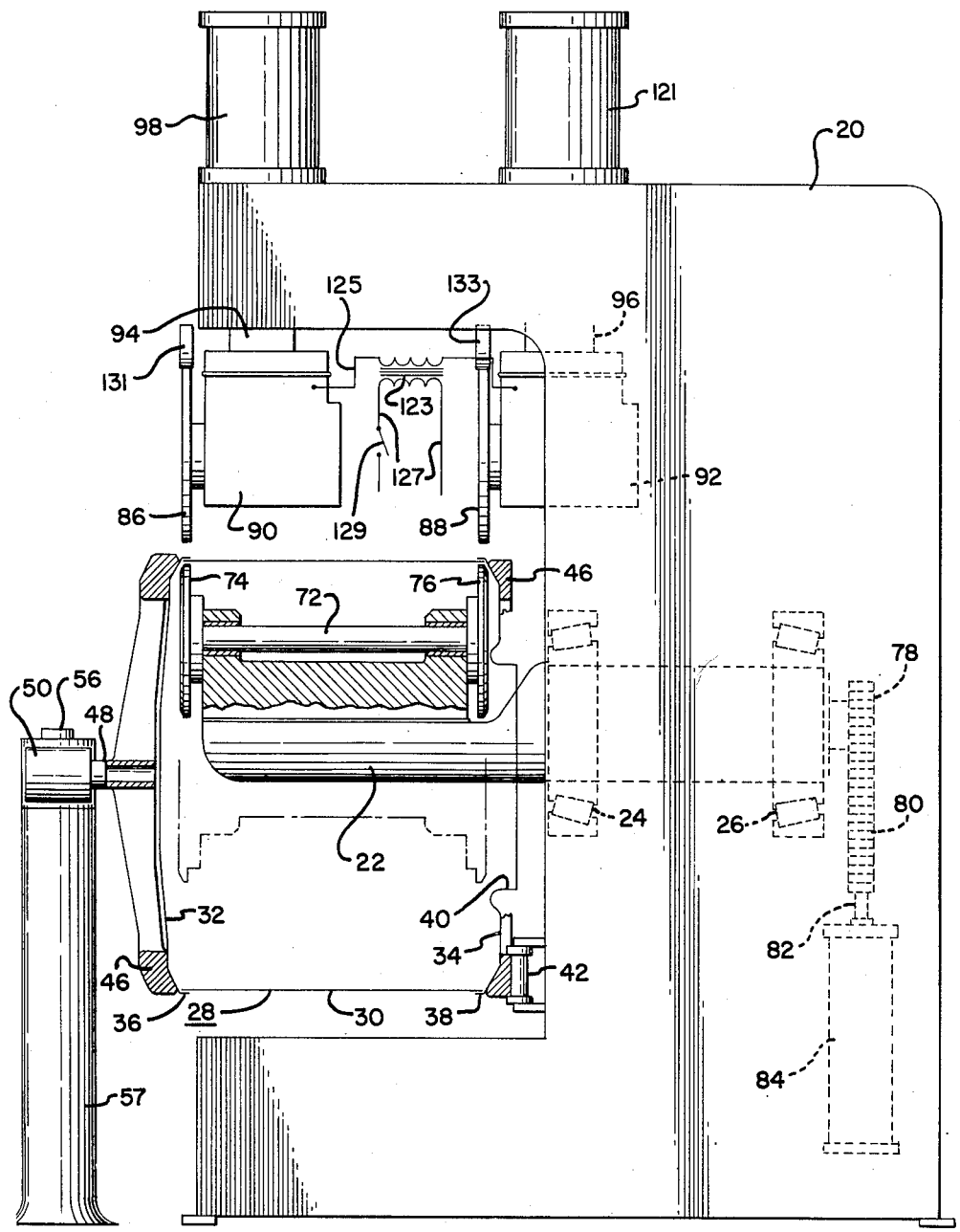
Figure 2 is a side elevation of the welding machine and support including a drum and drum support with the welding supports indexed into welding position.

As one particular example of my invention it is shown applied to the welding of a hollow drum 28 which is shown in cross section in Figures 2 and 4. This drum includes a central cylindrical portion 30 and the end portions 32 and 34 having inwardly turned flanges 36 and 38 which overlap the cylindrical portion 30 as shown in Figures 2 and 4. The end 34 is provided with a concentric flanged opening 40.

The frame 20 is provided with three flanged supporting rollers 42 which support the one pressure ring 44 adjacent the frame 20. The drum 28 is held between the pressure ring 44 and a cooperating pressure ring 46 provided with a protruding shaft 48 which is rotatably mounted in the bearing 50. The bearing 50 forms the end portion of a lever 52 provided intermediate its ends with a pivot bearing 54 which is pivotally mounted upon a pin 56 at the top of the pedestal 57. The pedestal 57 is provided upon the floor adjacent or upon the base of the frame 20.

The lever 52 has a pneumatic or hydraulic cylinder 58 located adjacent its short arm 60. This pneumatic or hydraulic cylinder 58 is provided with a piston and a shaft 62 extending from the piston out of the cylinder 58. When the piston and the shaft 62 are retracted away from the short arm 60 of the lever 52, the pressure ring 46 may be pivoted away from the welding machine and the drum location so that the drum may be slipped over the shaft 22 when it is in the position shown in Figure 3. The drum is then moved against the pressure ring 44 to which it may be removably fastened or otherwise held temporarily. The flanged opening 40 in the end wall 34 is sufficiently large to enable the drum to be slipped over the overhanging portion of the shafts 22 and any other parts which may be fastened or connected to the shaft 22.

After the drum 28 is placed in proper position against the ring 44 and concentric thereto the second pressure ring 46 is placed against the opposite end wall 32 of the drum by pivoting the lever upon its pivot 56. Then the piston within the cylinder is actuated to cause the shaft 62 to move into engagement with the lever 60 with sufficient force to hold the pressure ring 46 tightly against the end wall 32 of the drum 28. The end walls 32 and 34 and the pressure rings 44 and 46 are so shaped that the drum is centered upon its axis and the axis of the pressure rings 44 and 46. The axis of the drum 28 and pressure rings 44 and 46 is horizontal and parallel to the axis of rotation of the shaft 22.

The shaft 22 is provided with a wide flat portion 64 extending substantially across the major diameter to which is fastened a bearing member 66 provided with the spaced bearings 68 and 70. Rotatably mounted within the bearings 68 and 70 is an axle 72 upon the outer ends of which are fastened the welding wheels 74 and 76. The welding wheels 74 and 76 are sufficiently small in diameter and the axle 72 has its axis sufficiently close to the axis of the shaft 22 that the combined maximum dimensions of the overhanging portion of the shaft 22 and the welding wheels 76 as assembled are less than the inner diameter of the flanged opening 40. The axis of the pressure rings 44 and 46 and the drum 28 is just the correct distance beneath the axis of the shaft 22 to permit the drum 28 to be slipped horizontally upon the shaft 22 when the shaft is located in the position shown in Figure 3. In this position the flanged opening 40 of the drum may slide upon the top surface of the shaft 22 until the end wall 34 of the drum engages the pressure ring 44 which will lift it slightly out of contact with the top surface of the shaft 22. The pressure ring 46 then is moved into engagement with the end wall 32 as previously described and held there by the shaft 62 of the hydraulic cylinder 58 as previously explained.

To rotate the shaft 22 in order to place the welding wheels 74 and 76 in contact with the inner surface of the drum 28, the inner end of the shaft 22 is provided with a pinion 78 which is fixed to it. The pinion 78 is rotated by a rack 80 connected to the upper end of a piston rod 82 projecting from the hydraulic or pneumatic cylinder 84 within the frame 20 of the welding machine. The piston rod 82 is connected to a piston within the cylinder 84. When pressure is applied to the piston within the cylinder 84 the piston is moved downwardly with the piston rod 82 and the rack 80 to rotate the shaft 22 through an angle of 180° so as to place the welding wheels 74 and 76 in contact with the inner surface of the central cylinder portion 30 of the drum 28 and directly adjacent the lap joints 36 and 38 as shown in Figures 2 and 4.

Directly above the welding wheels 74 and 76 and the lap joints 36 and 38 of the drum 28 are the independent welding wheels 86 and 88 which are rotatably mounted in the bearings 90 and 92. These bearings 90 and 92 are fastened to the lower end of the piston rods 94 and 96 which may be moved downwardly by the pistons within the cylinders 98 and 121 which are in vertical alignment with the piston rods 94 and 96. The cylinders 98 and 121 as well as the cylinders 84 and 58 are fastened firmly to the frame 20. When either pneumatic or hydraulic pressure is applied to the pistons in the cylinders 98 and 121, the piston rods 94 and 96 and the bearings 90 and 92 are lowered until the welding wheels 86 and 88 engage the outer surfaces of the lap joints 36 and 38 with suitable welding pressure.

A welding transformer 123 is provided within the frame 20 and is connected by flexible conductors 125 to the bearings 90 and 92. The welding transformer 123 is connected by suitable conductors 127 and a suitable control switch 129 to a suitable power source. The transformer 123 supplies a suitable low voltage high amperage welding current to the bearings 90 and 92. This will cause current to flow through the welding wheel 86 and the lap joint 36 to the welding wheel 74 and through the axle 72 to the welding wheel 76 and from the welding wheel 76 through the lap joint 38 to the welding wheel 88 and back to the transformer 123. This will cause the lap joints 36 and 38 to be roll welded simultaneously.

The welding wheels 86 and 88 are preferably peripherally driven by the rollers 131 and 133 in contact with the periphery of the wheels 86 and 88. This causes the wheels 86 and 88 to rotate at a suitable speed for roll welding. These wheels 86 and 88 through their contact with the drum 28 at the lap joints 36 and 38 drive the drum at a desirable linear speed for roll welding until the drum has been rotated through 360° and the lap joints 36 and 38 likewise welded through 360°.

After the lap joints 36 and 38 have been welded the shaft 22 is rotated through 180° by the proper application of fluid pressure within the cylinder 84 to move the rack 80 and the pinion 78 until the shaft 22 is returned to the position shown in Figure 3. The proper application of pressure to the piston within the cylinder 58 retracts the piston rod 62 to the position shown in Figure 5 thereby making it possible to swing the pressure ring 46 and the lever 52 about the pivot pin 56 away from the drum 28 so that the welded drum may be removed and another drum to be welded inserted in its place. While my invention has been described as being particularly applicable to the welding of the lap joints of a drum it should be understood that this supporting arrangement may be used for supporting other types and shapes of hollow objects for welding and for various other purposes.

While the embodiment of the present invention as herein disclosed, constitutes a preferred form, it is to be understood that other forms might be adopted.

What is claimed is as follows:

1. A welding machine including a support, a rotatable member rotatably mounted upon said support and having an axis of rotation, an axle rotatably mounted upon said rotatable member on an axis eccentric to said axis of rotation, two welding wheels mounted in spaced relation upon said axle, a rotatable drum support for a drum having an axis of rotation eccentric to but parallel to said first mentioned axis of rotation, said first mentioned support being provided with two movable cooperating welding wheels adapted to cooperate with said two wheels upon said axle, and means for passing a welding current to one of said cooperating welding wheels through the first mentioned two wheels and the axle to the second cooperating welding wheel when a drum is in place on said rotatable drum support surrounding said rotatable member.

2. A welding machine including a support, a rotatable member rotatably mounted upon said support and having an axis of rotation, an axle rotatably mounted upon said rotatable member on an axis eccentric to said axis of rotation, two welding wheels mounted in spaced relation upon said axle, said support being provided with two cooperating welding wheels adapted to cooperate with said two wheels upon said axle, a drum support surrounding said rotatable member rotatably mounted upon said first mentioned support on an axis eccentric to but parallel to said first axis of rotation, a second drum support rotatable upon the same axis as said first mentioned drum support and cooperating with said first mentioned drum support for supporting a drum, and means for passing a welding current to one of said cooperating welding wheels through the first mentioned two wheels and the axle to the second cooperating welding wheel when a drum is in place on said rotatable drum supports surrounding said rotatable member.

3. A welding machine including a support, a rotatable member rotatably mounted upon said support and having an axis of rotation, an axle rotatably mounted upon said rotatable member on an axis eccentric to said axis of rotation, two welding wheels mounted in spaced relation upon said axle, said support being provided with two cooperating welding wheels adapted to cooperate with said two wheels upon said axle, a drum support surrounding said rotatable member rotatably mounted upon said first mentioned support on an axis eccentric to but parallel to said first axis of rotation, a second drum support rotatable upon the same axis as said first mentioned drum support and cooperating with said first mentioned drum support for supporting a drum, a movable mounting for said second drum support for movement away from said first mentioned drum support for loading a drum over said rotatable member on to said drum supports, and means for passing a welding current to one of said cooperating welding wheels through the first mentioned two wheels and the axle to the second cooperating welding wheel when a drum is in place on said rotatable drum supports surrounding said rotatable member.

References Cited in the file of this patent

UNITED STATES PATENTS

| 1,322,479 | Buchenberg | Nov. 18, 1919 |
| 1,601,927 | Tobey | Oct. 5, 1926 |
| 2,314,437 | Anderson | Mar. 23, 1943 |

FOREIGN PATENTS

| 404,598 | Germany | Oct. 21, 1924 |
| 380,397 | Great Britain | Sept. 15, 1932 |